Figure 5:
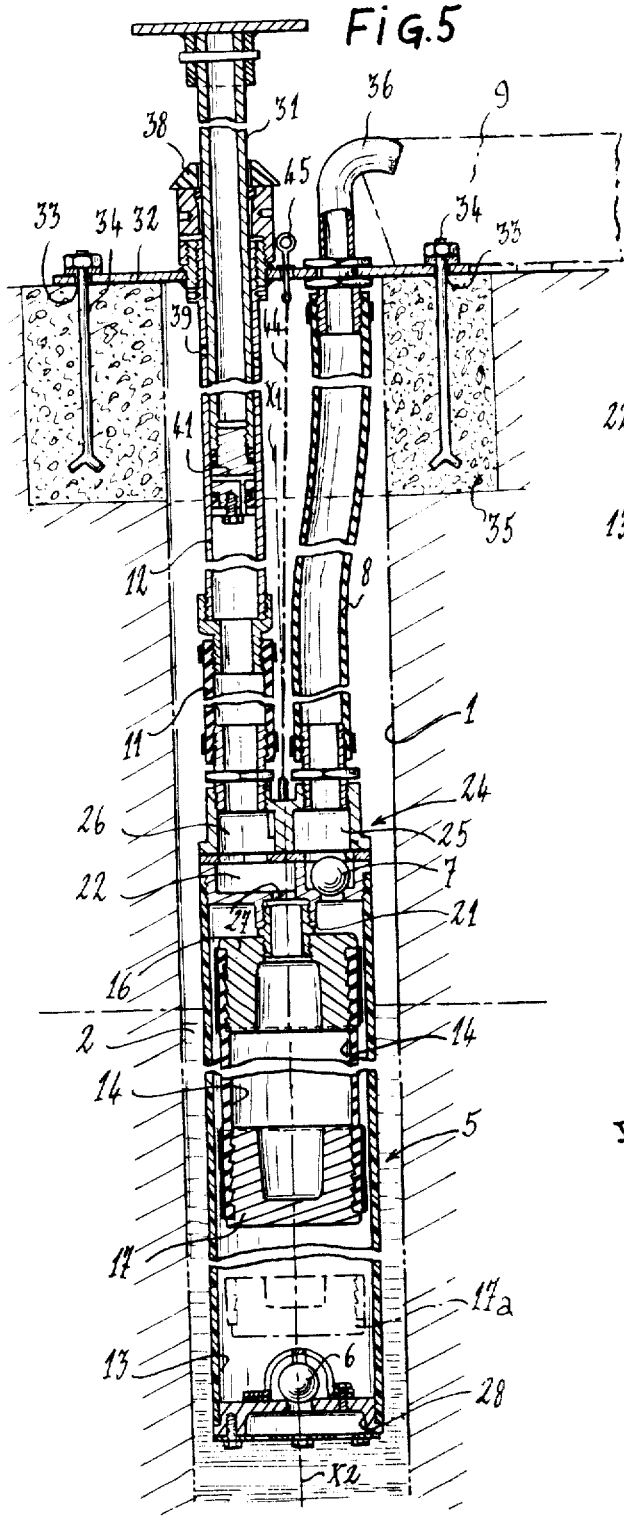

United States Patent [19]

Vergnet

[11] 4,008,008

[45] Feb. 15, 1977

[54] PUMPS

[76] Inventor: Marc Yves Vergnet, 1, Chemin du Val Doux, "La Paveigne", 83200 Toulon, France

[22] Filed: Jan. 3, 1975

[21] Appl. No.: 538,379

[30] Foreign Application Priority Data

June 21, 1974  France .............. 74.21593

[52] U.S. Cl. ................ 417/385; 92/92; 417/394

[51] Int. Cl.$^2$ ........................ F04B 9/08

[58] Field of Search ......... 417/378, 384, 385, 387, 417/388, 394, 395, 383, 435, 502; 60/542, 543, 592, 584; 92/42, 92

[56] References Cited

UNITED STATES PATENTS

| | | | |
|---|---|---|---|
| 862,867 | 8/1907 | Eggleston | 417/395 |
| 884,769 | 4/1908 | Shafer | 417/435 |
| 1,630,902 | 5/1927 | Parrish | 417/387 |
| 2,156,415 | 5/1939 | Weihe | 60/584 X |
| 2,582,210 | 1/1952 | Stanton | 417/394 X |
| 2,807,215 | 9/1957 | Hawxhurst | 417/388 |
| 2,812,721 | 11/1957 | Coberly | 417/503 |
| 2,852,921 | 9/1958 | Ayers | 92/42 X |
| 3,094,074 | 6/1963 | Tuckey | 417/394 X |
| 3,309,012 | 3/1967 | Booth et al. | 417/394 X |
| 3,401,607 | 9/1968 | Wortman | 92/42 X |
| 3,411,452 | 11/1968 | Czarnecki et al. | 417/388 |
| 3,481,254 | 12/1969 | Wetherbee | 92/92 |
| 3,635,607 | 1/1972 | Grise | 417/394 |

FOREIGN PATENTS OR APPLICATIONS 1,911,525  10/1969  Germany .............. 417/394

*Primary Examiner*—William L. Freeh
*Assistant Examiner*—Edward Look
*Attorney, Agent, or Firm*—Young & Thompson

[57] ABSTRACT

The invention provides a pump adapted inter alia for the intake and delivery of liquid such as water in wells or relatively deep bodies of water. The pump comprises a rigid-walled chamber, adapted to be immersed in the liquid to be sucked in. The rigid-walled chamber has an intake valve and a delivery valve interposed between the rigid-walled chamber and a delivery tube. The pump is characterized in that it comprises, accommodated in the rigid-walled chamber, a resiliently deformable chamber associated with means for controlling, at least in one direction, alternate deformations of the chamber by expansion and retraction.

6 Claims, 11 Drawing Figures

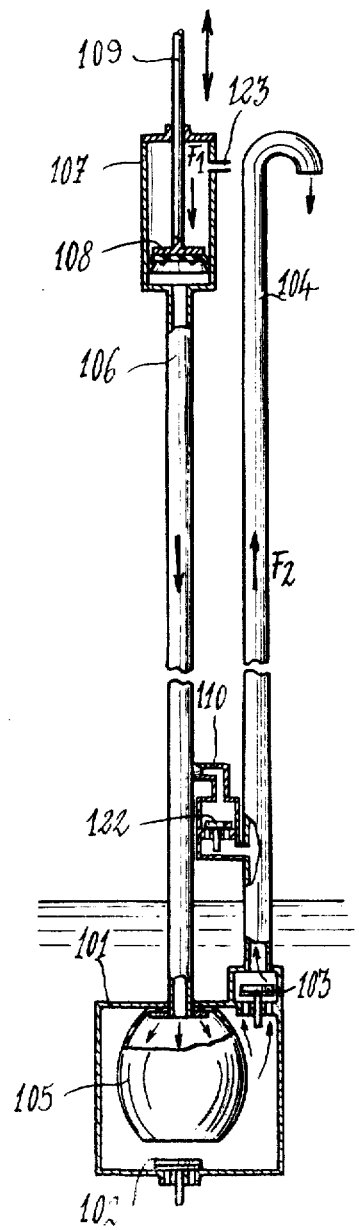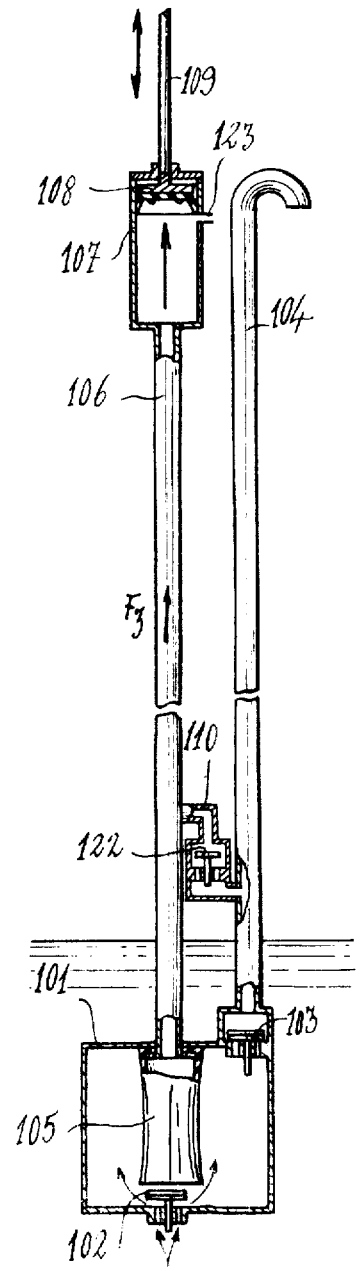

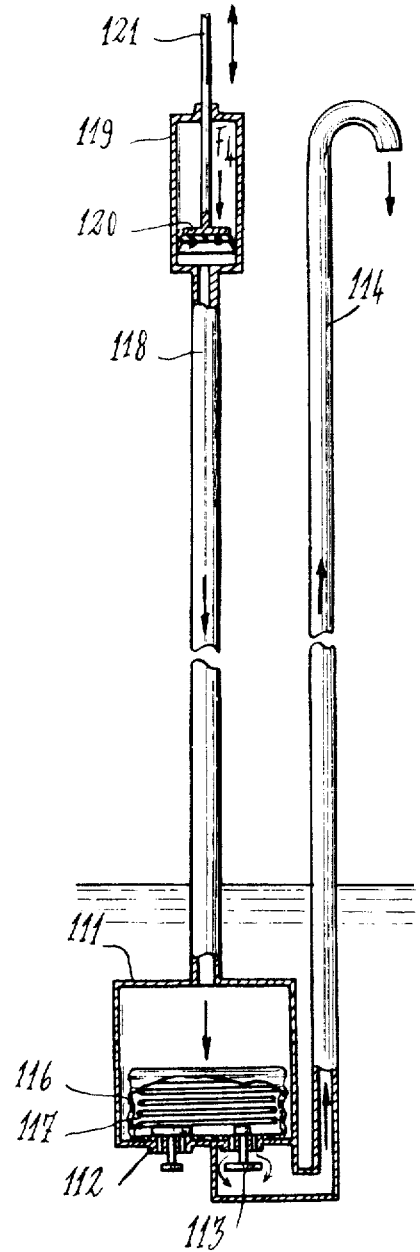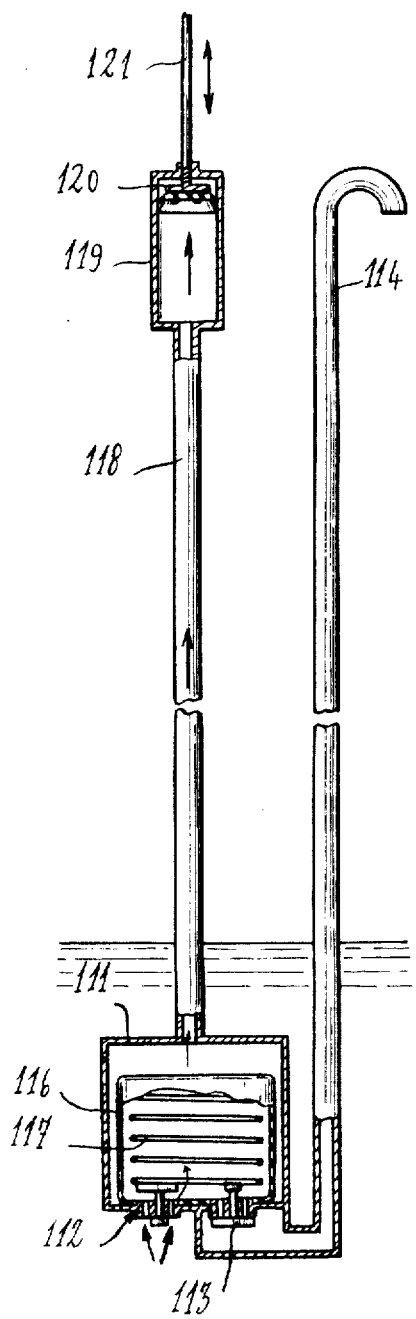

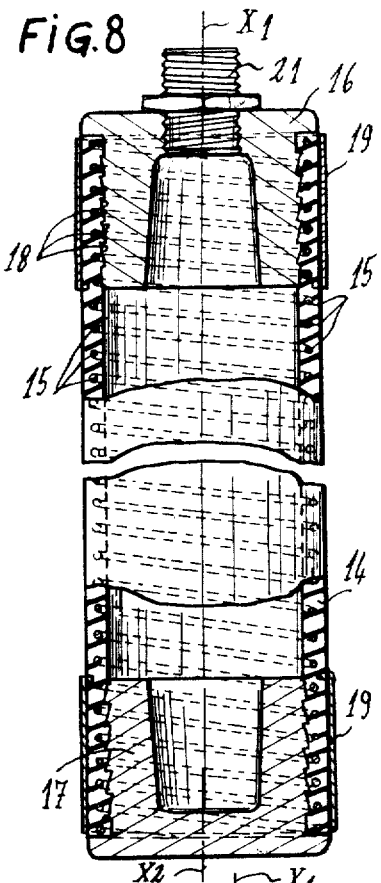
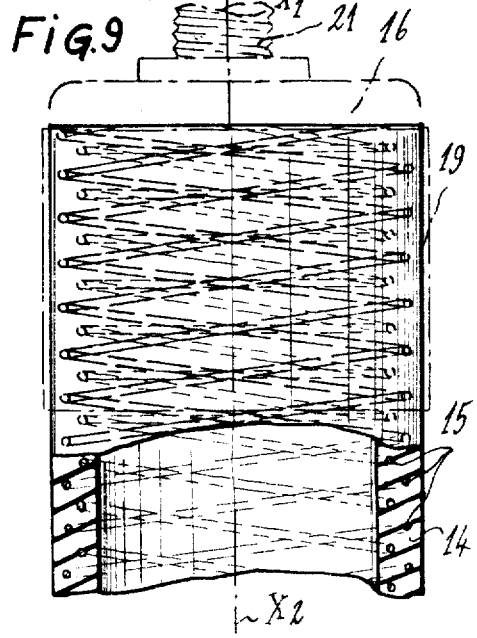
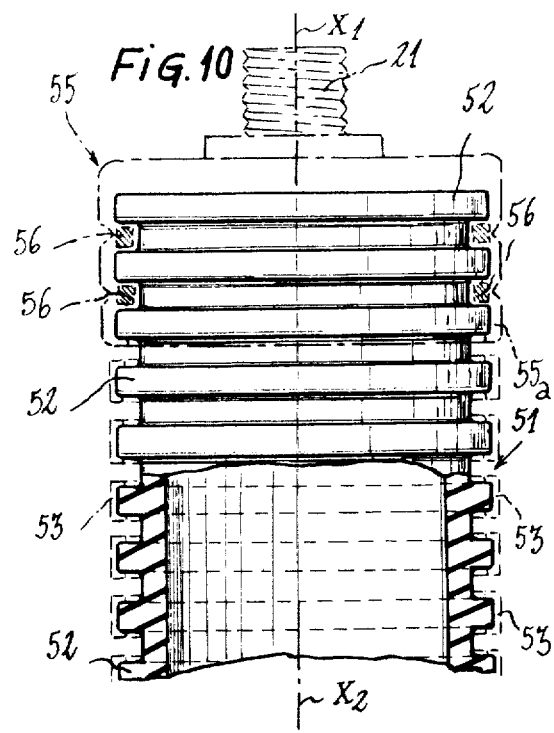
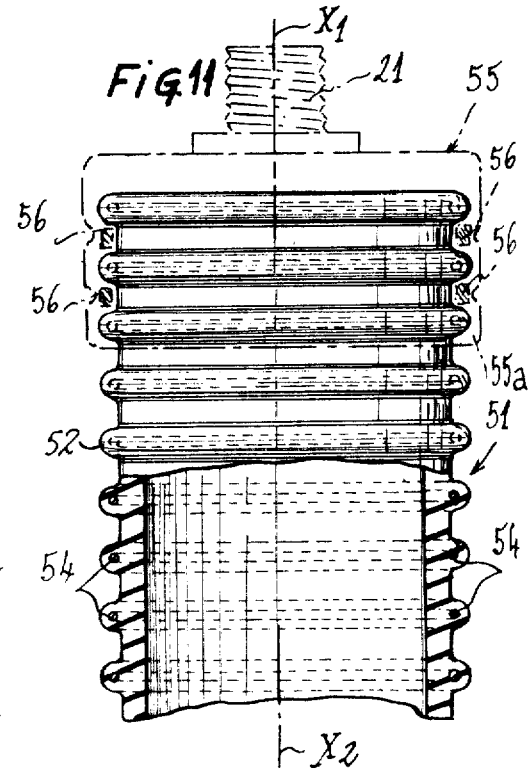

PUMPS

The invention therefore provides a very simple pump, since the intake into the rigid-walled chamber is performed automatically, and without outside work, since the deformable chamber automatically resumes its initial shape because of its resilience. The invention enables the provision of an extremely simple cheap pump, adapted inter alia to be used in African countries to draw water from considerable depths.

According to a preferred feature of the invention, the resilient form of the chamber is connected via a control tube to a control device comprising an associated cylinder and piston, the seats of the intake and delivery valves being disposed on one of the walls of the rigid-walled chamber. Advantageously, the resilient control chamber, the control tube and the control cylinder are filled, the use of the pump, with a liquid in the operative position.

Preferably, the delivery tube and the control tube are connected, adjacent the rigid-walled chamber, by a conduit including a communication valve allowing the liquid to flow only in the direction from the delivery tube to the control tube. The pump can, therefore, be started automatically.

In another embodiment of the invention, the rigid-walled chamber is connected via a control tube to a control device comprising an associated cylinder and piston, the wall of the deformable chamber bearing the seats of the intake and delivery valves.

One advantageous varient of the invention relates to a pump adapted to be installed inter alia in countries where water is rare and technical means limited. The pump must, therefore, be able to operate substantially without maintenance or special supervision. It must also be economical and easy to install. Moreover, the pump must occupy very little diametric space, so that it can fit readily into a narrow drill hole, for instance, of 10–15 cms in diameter, such as is commonly used for drawing water from a deep body of water.

These conditions which must be met result in a number of constructional difficulties, inter alia due to the narrow immersed rigid-walled chamber which must be used, if nevertheless the intention is that it should receive a deformable chamber of relatively considerable useful volume, to make the pump efficient. The reason is that whenever the deformable chamber makes its alternating expansion and retraction movement it risks rubbing against the walls of the rigid-walled chamber and becoming quickly worn, due to sand or gravel often entering with the water. Moreover, to prevent the rigid-walled chamber from being temporarily closed by the expanding resilient chamber, with adverse effect on pump performance, the relatively fragile and complicated immersed rigid-walled chamber would have to be provided comprising, for instance, passages orientated in the axial direction and attached to or formed in its walls.

A varient of the pump disclosed hereinafter enables the aforementioned disadvantages to be obviated and a simple and robust pump to be provided which can readily be installed in a narrow drill hole. The pump comprises elements which are easy to produce, more particularly an immersed rigid-walled chamber with smooth walls, and a deformable chamber of considerable useful volume in relation to that of the rigid-walled chamber.

In this varient, the rigid-walled chamber adapted to be immersed comprises an elongate hollow cylindrical member adapted to fit into a drill hole terminating in a body of water, the deformable chamber comprising a resilient sleeve coaxial with the cylindrical member and mounted therein with reduced radial clearance, the wall of the resilient sleeve having means such as transverse reinforcements to limit its radial expansion as a result of internal pressure and to allow the sleeve to expand substantially in the axial direction under the effect of such pressure.

Since the resilient sleeve expands substantially in the axial direction, the result is that the sleeve can be prevented from rubbing against the wall of the cylindrical member and closing it temporarily every time the sleeve expands. Since there is only a reduced radial clearance between the sleeve and the wall of the cylindrical member, the useful volume of the sleeve can be relatively considerable. The pump life and yield are, therefore, greatly improved.

In one advantageous embodiment, the resilient sleeve comprises two end caps, one of the caps being detachably fixed to the upper end wall of the cylindrical member in the operational position, by means of an axial tubular connection communicating with the control tube; the transverse reinforcements of the resilient sleeve are encased in its walls; the wire is helically wound coaxially in relation to the axis of the sleeve and has an inclination of the order of 5° in relation to a plane perpendicular to such axis.

Preferably, the conduit and valve for communication between the delivery tube and the control tube of the resilient sleeve are grouped in a casing detachably mounted in a casing at the upper end of the cylindrical member in the operational position, such casing occupying substantially the same diametric space as the cylindrical member and being formed towards the top with a connecting aperture for each of the control and delivery tubes and, towards the bottom, with a connecting aperture for the resilient sleeve. As will be explained hereinafter, these arrangements conveniently produce an economic, durable pump which can easily be installed and maintained.

Figure 6:
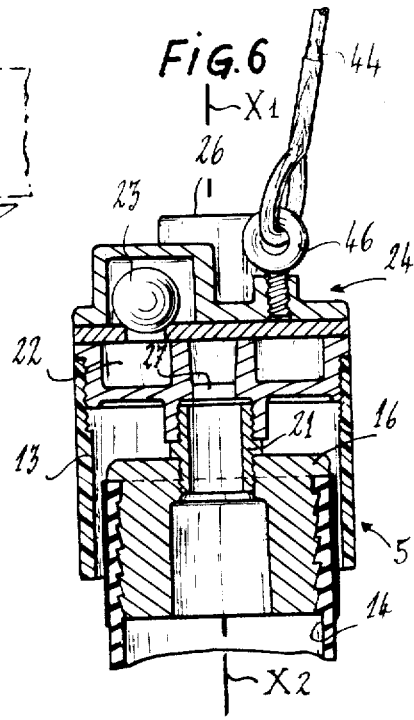
Figure 7:
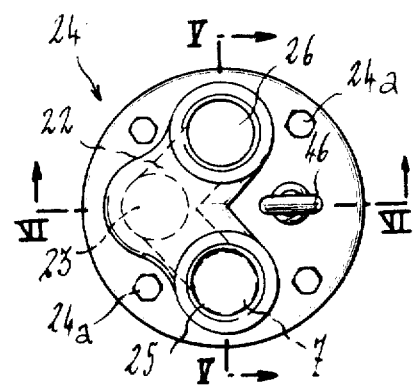

For a better understanding of the present invention and to show how the same may be carried into effect, reference will now be made, by way of example, to the accompanying drawings, in which:

FIGS. 1 and 2 show diagrammatic sectional views of a first embodiment of the invention, FIGS. 3 and 4 show diagrammatic sectional views of a second embodiment of the invention, FIG. 5 shows an overall view, in axial section, of a further embodiment of pump according to the present invention, installed in a narrow drill hole, taken along V—V of FIG. 7, FIG. 6 shows an axial sectional view through the upper part of the cylindrical member of the pump of FIG. 5, taken along VI—VI of FIG. 7, FIG. 7 shows a plan view corresponding to FIG. 6, FIG. 8 shows a partial enlarged view of the lower part of FIG. 5, showing in axial section the resilient sleeve separated from the cylindrical member, and FIGS. 9 to 11 show varients of the resilient sleeve shown in FIG. 8.

Referring now to the drawings, in a first embodiment of the invention (see FIGS. 1 and 2), the pump comprises a rigid-walled chamber 101 bearing in its lower part an intake valve 102 and in its upper part a delivery valve 103 for discharging into a delivery tube 104. The rigid-walled chamber 101 contains a resiliently deformable chamber 105 connected via a control tube 106 to a cylinder 107 in which a piston 108 slides, rod 109 of the piston 108 being connected to any suitable control means, for instance, a rod and crank assembly driven by a flywheel, pedal or any other similar device.

The delivery tube 104 and the control tube 106 can be connected adjacent the rigid-walled chamber 101 by a conduit 110 including a valve 122 allowing liquid to flow only from the delivery tube 104 to the control tube 106. Adjacent the upper end of the wall of the cylinder 107 is formed with a bleed hole 123.

The pump operates as follows:

The rigid-walled chamber 101 is so immersed that the pressure of water controls the opening of the intake valve 102 and the chamber 101 is filled. When the piston 108 is displaced in the direction $F_1$ (FIG. 1), the resilient chamber 105 is expanded, thus closing the intake valve 102 and driving the water contained in the rigid-walled chamber 101 through the delivery valve 103 into the tube 104, in the direction $F_2$.

During a first stage, when the pump is empty, the air contained in the cylinder 107, tube 106 and resilient chamber 105, being compressed by the descent of the piston 108, makes the resilient chamber 105 expand, to deliver the liquid trapped in the rigid-walled chamber 101. This liquid opens the valve 103, rises in the column 104 and passes through conduit 110 to fill the resilient chamber 105.

As the piston 108 is acted upon, therefore, the resilient chamber 105, the control tube 106, and the cylinder 107 are filled with liquid, the air contained in such members escaping via the bleed hole 123. The pump can, therefore, be started automatically in a simple manner.

Having regard to the resilience of the chamber 105, when the piston 108 ceases to be acted upon, the chamber 105 retracts of itself and repels the liquid in the tube 106 in the direction $F_3$ (FIG. 2) to return the piston 108 to its raised position. It is, therefore, sufficient to actuate the piston 108 in the descending direction (see FIGS. 1 and 2) to bring a pump of this kind into operation.

In a second embodiment (see FIGS. 3 and 4), an immersed rigid-walled chamber 111 is connected via a control tube 118, similar to tube 106 in FIG. 1, to a control device comprising associated cylinder 119 and piston 120; rod 121 of the piston 120 can be actuated by any means, as already stated.

A resilient deformable chamber 116 is accommodated in the rigid-walled chamber 111. A part of the wall of a resilient chamber 116 is attached to that part of the wall of the rigid-walled chamber 111 which bears the seats of an intake valve 112 and a delivery valve 113, the latter communicating with a delivery tube 114.

The resilient deformable chamber 116 contains a compression spring 117 bearing against that part of the wall of the chamber 116 which is joined to the rigid-walled chamber 111, and against an opposite part of the wall of the chamber 116. The rigid-walled chamber 111 is immersed and previously filled with liquid, as are also the cylinder 119 and the control tube 118, the piston 120 being in the position illustrated in FIG. 4. When the piston 120 is displaced in the direction $F_4$ (see FIG. 3), the resilient chamber 116 is compressed, emptying via the delivery valve 113. As soon as the piston 120 ceases to be acted upon, the resilient chamber 116 returns to its initial position under the force of spring 117, sucking in the liquid outside via the intake valve 112, and delivering the liquid contained in the rigid-walled chamber 111 through the tube 118 for the ascent of the piston 120.

As in the embodiment illustrated in FIGS. 1 and 2, a tube such as 110 can be provided, connecting the delivery tube 114 and the control tube 118 with the interposition of a non-return valve, such as 122, for automatically starting the pump.

Of course, the invention is not limited to those embodiments which have just been described, and numerous varients can be made thereto without departing from the scope of the invention as defined in the appended claims.

For instance, one varient of the invention, illustrated in FIGS. 5 to 8, relates to a pump adapted to operate in a narrow drilled well 1.

The drilled well 1 measures, for instance 15 cms in diameter and terminates in a body of water 2, which is 25, or 30 meters is depth. The pump comprises a rigid-walled chamber 5 at least partly immersed by its base in a body of water 2 and having an intake valve 6 and a delivery valve 7. The latter forms a base valve of a delivery tube 8 discharging on the surface, for instance, in an irrigation channel 9.

In accordance with the invention, the pump comprises a resilient deformable chamber accommodated in the rigid wall chamber 5, and means which can be actuated from the surface of the ground to control positively the expansion of the deformable chamber, such expansion being followed alternately by the retraction of the chamber. The control means comprise a control tube 11 which can be filled with water and connects a control aperture of the deformable chamber to a cylinder 12 associated with a control piston disposed near the surface of the ground.

In the embodiment illustrated in FIGS. 5 to 8, the immersed rigid-walled chamber 5 comprises an elongate hollow cylindrical member 13 of axis X1–X2, for instance of light metal or rigid plastics material, adapted to fit into the drilling hole 1. The deformable chamber comprises a resilient sleeve 14 having a wall, for instance of rubber, coaxial with the wall of the cylindrical member 13 and mounted with a reduced radial clearance, for instance, of 5 mm in relation to such wall. The wall of the resilient sleeve 14 has means such as transverse reinforcements to limit the radial extension thereof under the effect of the internal pressure communicated by the control tube 11, and to allow the sleeve 14 to expand substantially in the axial direction, under the effect of such internal pressure.

Having regard to the internal pressure envisaged, an adequate space is left in the lower part of the cylindrical member 13 (see FIG. 5) to enable the end of the resilient sleeve 14 to occupy the expanded position freely, in which the internal pressure action on the sleeve 14 is completely equiliberated by the resilient resistance of the wall thereof.

In the embodiment illustrated by way of example in FIGS. 5 and 8, the transverse reinforcements of the resilient sleeve 14 are formed by a sheet of wire (thread) 15, for instance of synthetic fibres, encased in the wall of the sleeve 14, helically wound around the axis X1–X2 of the sleeve and having an inclination of about 5° in relation to a plane perpendicular to the axis X1–X2.

The sleeve 14 comprises two end caps 16 and 17, made, for instance, of rigid plastics material or light metal, each having a substantially cylindrical body fitting into one end of the sleeve and having annular projections 18 to retain such end. The end is clamped against the annular projections 18 by a collar 19, for instance of aluminum or brass, mounted with a radial crimping effect to compress the wall of the resilient sleeve 14 against the projections 18. At the bottom of the sleeve 14, the cap 17 ensures the sealing-tightness of the resilient sleeve 14 and can move together therewith into the extended position 17a (see FIG. 5). The upper cap 16 comprises a screw threaded axial hole for a tubular connection 21 for attaching the sleeve 14 detachably to the upper end wall of the cylindrical member 13. The tubular connection 21 communicates with the control tube 11, as will be explained hereinafter.

The pump comprises a communication conduit 22 (see FIG. 6) and a communication valve 23, between the delivery tube 8 and the control tube 11, as already explained with regard to FIGS. 1 and 2. In this particular embodiment, the communication conduit 22 and the associated valve 23 are grouped in a casing 24 forming a cap for the upper end of the cylindrical member 13 in the operational position. Mounted detachably on such end, the casing 24 occupies substantially the same amount of diametric space as the cylindrical member 13 and is formed towards the top with two connecting apertures 25, 26 for the delivery tube 8 and control tube 11 respectively. The two apertures 25 and 26 preferably have different diameters, to avoid connection errors.

The control aperture 26 permanently communicates with the tubular connection 21 of the resilient sleeve 14 (see FIG. 5) via a third aperture 27 disposed in the lower part of the casing 24. In contrast, the delivery aperture 25 is separated from the inside of the cylindrical member 13 by the ball valve 7 also accommodated in the casing 24. To facilitate the assembly and maintenance of the pump, the casing 24 made, for instance, of moulded plastics material, is made up of a number of parts assembled in sealing-tight relationship by bolts 24a (see FIG. 7).

The lower end of the cylindrical member 13 (see FIG. 5) comprises a demountable cap 28 containing the intake valve 6 and is made, for instance, of moulded plastics material. The valves 6, 7 and 23 are readily demountable and each comprise a spherical rubber ball, for instance 30 mm in diameter, associated with a circular seat of rounded profile. A ball-retaining cage allows the ball to rise for circulation of water in the required direction.

In the embodiment described here by way of example, the control cylinder 12 (see FIG. 5) is disposed vertically in the operational position. The piston can be operated from outside, for instance by means of a rod 31 actuated by an articulated lever (not shown). In the upper part, the cylinder 12 is attached to a bed plate 32 formed with holes 33 through which attaching feet 34 extend which are sealed in solid masonary 35 extending all around the entrance of the drilled hole 1.

The cylinder 12 is, therefore, accommodated in the upper part of the drill hole 1, through which there also extend the control tube 11 and the delivery tube 8 connected to a flow tip 36 borne by the plate 32. The cylinder 12 is surmounted by an annular rubber stop 38 to deaden the introduction movement of the rod 31 of the plunger.

Adjacent the plate 32 (see FIG. 5), the wall of the cylinder 12 is formed with a bleeding aperture 39 communicating with the outside. The aperture 39, which must be disposed about 1.20 m below the top mouth of the delivery tube 8, is disposed opposite a bleeding channel 41 of the plunger, when the latter is in the upper end of the cylinder 12, for starting the pump, as will be explained hereinafter.

The plate 32 also bears attaching means for a cable 44 by means of which the cylindrical member 13 is suspended in the drill hole 1 at a required height in relation to the sheet of water 2. The attaching means comprise, for instance, a sliding rod 45, about 1 or 2 m in length, with a widened head. A hole in the plate 32 retains the head of the rod 45 in the operational position, as shown in FIG. 1, but the rest of the rod can be freely withdrawn via such hole, entraining the upper end of the cable 44.

As explained hereinafter, the sliding rod 45 facilitates the location and extraction of the cylindrical member 13 and the plate 32.

To pump a body of water 2 about 33 meters in depth, using a drill hole 1 having a diameter of 15 cm, a pump as set forth hereinbefore was made industrially, comprising a hollow cylindrical member 13 made of a rigid plastics material, for instance polyvinyl chloride. The member had a wall 6.5 mm in thickness, an outside diameter of 12.5 cm and a length of 110 cm. At rest the resilient sleeve 14, made of natural rubber, had an outside diameter of 10.6 cm and a free length of 52.5 cm, between the end caps 16 and 17 (see FIG. 8). The wall, which had a thickness of the order of 13 mm for an outside diameter of about 10 cm, was reinforced by a helically wound sheet of threads. Preferably (see FIG. 9) the sheet comprised two opposite co-axially windings of synthetic fibre threads of 0.9 mm of the nylon type. Two windings were symmetrically inclined by about 5° in relation to a plane perpendicular to the axis X1–X2.

A workshop check was made on the sealing-tightness of the members and connections of the pump, and also to make sure that there were no excessive deformations, under a testing water pressure of 5 bars. This pressure was applied to the cylindrical member 13, furnished with the resilient sleeve 14 and the tubes 8 and 11 connected to the control cylinder 12 and the flow tip 36, respectively.

Under a normal operating pressure close to 3 bars, the deformation of the cylindrical member 13 was slight, as also was that of the tubes 8 and 11 and the control cylinder 12. In contrast, such operating pressure applied to the resilient sleeve 14 elongated it by about 22 cm — that is about 50 percent of the free length at rest. However, the radial expansion of the sleeve 14 remained well below the clearance of the order of 3 mm provided during assembly in relation to the wall of the cylindrical member 13.

The location and operation of the pump described hereinbefore will now be explained with reference to FIGS. 5 to 9.

First of all, the solid masonary 35 (see FIG. 5) was prepared with the sealed feet 34, to receive the bed plate 32. Measurement was made of the depth at which the cylindrical member 13 should be placed, for instance, to immerse at least half the length. As a result, the length of the suspension cable 44 was determined, one end of which is attached to loop 46 of the member 13 (see FIG. 6). The tubes 8 and 11 were formed, for instance, by semi-rigid high density polyethylene elements, of 3 or 4 meters in unitary length, connected end to end by demountable sleeves. Attached to each of the apertures 25 and 26 of the casing 24 (see FIG. 7) was a first element of the tubes 8 and 11, and the cylindrical member 13 was introduced into the drill hole 1, in which it was allowed to descend while being retained by the cable 44. The successive elements from the tubes 8 and 11 were added end to end, finishing up with a resilient element, of about 2 m, for instance, adjusted to the required length for each tube.

The cable 44 was retained by means of a hoisting apparatus (not shown) comprising a hook attached to the head of the sliding rod 45. Preferably, the plate 32 is formed with a slot (not shown) which terminates at the hole through which the rod 45 extends, to facilitate the location of the plate 32, by presenting it laterally flat facing the rod 45, suspended as already stated. It was then enough to introduce the rod into the slot, displacing the plate 32 horizontally.

By keeping the plate 32 raised above the solid masonary 35, the resilient ends of the tubes 8 and 11 could be connected to the flow tip 36 and control cylinder 12. Then, the plate 32 was lowered onto the solid masonary 35 to be attached by the feet 34. Allowing the head of the sliding rod to rest on the plate 32, the cylindrical member 13 was then brought to the required depth.

The cable 44 was, therefore, constantly kept under tension, to retain the cylindrical member 13, avoiding subjecting the tubes 8 and 11 and their connections to an excessive pull.

By acting on the rod 31 of the plunger associated with the control cylinder 12, for instance, by means from an articulated lever (not shown), the pump was progressively primed, as explained, during the progressive priming of the pump, the communicating conduit 22 and the valve 23 (see FIG. 5 to 7) ensured that the water was at the same level in the tubes 8, 11.

The sleeve 34 alternately expanded at each pulsation of the plunger in the control cylinder 12. The resilience of the sleeve 34 tended to oppose the introduction of the plunger and to repel the rod 31. In the top end position of the piston, the bleeding channel 41 (see FIG. 5) was opposite the bleeding aperture 39 of the control cylinder 12, to allow the air coming from the sleeve 14 and the tube 11 to escape. When the tube 11 was filled with water, each impulse from the plunger of the control cylinder 12 was transmitted vigorously to the resilient sleeve 14. It was then enough to actuate the rod 31 over a relatively short travel to obtain an adequate elongation of the sleeve 14 and deliver via the tip 36 a fairly considerable amount of water at each stroke of the pump.

In the industrial construction already mentioned, the control cylinder 12 (see FIG. 5) was a metal tube having a 40 mm bore and 52 mm in outside diameter. The maximum stroke of the plunger in the tube was about 50 cm, corresponding substantially to a displacement of 750 cubic centimeters. As the resilient sleeve 14 has an inside diameter of 90 mm — more than twice the bore of the control cylinder 12 — the elongation of the sleeve 14 is about equal to one-quarter of the travel of the rod 31 when the sleeve 14, tube 11 and control cylinder 12 are filled with water.

The tubes 8 and 11, made of semi-rigid polyethylene, measure about 24 mm in inside diameter and 32 mm in outside diameter. During the normal operation of the pump, the circulation of water in the delivery tube 8 tends to maintain a moderate temperature, for instance 20° C in the drill hole 1, thus improving the rigidity and life of all the plastics material elements, even if the outside temperature is high.

For the depth and dimensions stated hereinbefore, it will be noted that the resilience of the control cylinder 12 and the cylindrical member 13 has a negligible effect on the pump performance. Similarly, resilience of the control tube 11 and of its flexible part absorbs only a very small proportion of the volume displaced by the plunger of the control cylinder 12. By using elements which are similar, but substantially twice as thick, the same pump performance can be maintained up to a depth of 60 meters.

Clearly, the pump as described hereinbefore affords several important advantages. The elongate cylindrical member 13 facilitates the mounting of the pump in a narrow drill hole. The resilient sleeve 14 with transverse reinforcements is very durable, due to the absence of radial expansion, avoiding rubbing against the wall of the cylindrical member 13. Moreover, this absence of radial expansion prevents the cylindrical member 13 from being temporarily obstructed by the pressure by sleeve 14, with constant gain in one performance. The sleeve 14 is detachable and can readily be replaced.

The grouping of the valve 7 and 23 and the communicating conduit 22 in the detachable, demountable casing 24 facilitates the economic manufacture of the pump and its maintenance. The grouping of the control cylinder 12, the flow tip 36 and the means of attaching the cable 44 to the plate 32 enables the immersed cylindrical member 13 to be conveniently put in place and removed. The control cylinder 12 is accommodated shileded against impacts under the plate 32, in the upper part of the drill hole 1.

Of course the numerical values indicated hereinbefore are given merely by way of illustrative examples and are not limitative.

In another variant, the transverse reinforcements of the resilient sleeve 51 (see FIG. 10) made, for instance, of moulded rubber, are formed by parallel annular beads 52 made by moulding on the wall of the sleeve. Preferably, the beads 52 project from the sleeve wall on the outside which is adapted to face the cylindrical member 13. In this way, the thin part of the wall of the sleeve 51 can expand radially to slight extent between the beads 52, under the effect of an inside pressure, without contacting the wall of the member 13.

If necessary, more particularly for a pump adapted to considerable depths, the rigidity of each annular bead 51 can be improved by means of a reinforcement in the free part of the sleeve 51. Such reinforcement can be formed, for instance, by a metal ring 53 of U-section which is externally crimped on the bead 52. Such rings on the beads 52 are shown in chain lines in FIG. 10. In another embodiment (see FIG. 11), the reinforcement of each free bead 52 is formed by a metal ring 54 encased by moulding in the section of the bead.

As shown diagrammatically in FIGS. 10 and 11, the annular beads 52 can be used to improve the location of the end caps, as 55, similar to the caps 16 and 17 in FIG. 8. Opposite a cylindrical part introduced into the end of the sleeve, as is the case in FIG. 8, the cap 55 comprises a bush 55a which is parallel with the axis $X1-X2$ of the sleeve and between which two or three annular beads 52, for instance, can be introduced. The bush 55a plays a similar role to the collar 19 (see FIG. 8) and like the latter is radially crimped, to apply the end of the sleeve 51 (see FIGS. 10 and 11) against the retaining projections 18 of the cap (see FIG. 8). Crimping is preferably performed in each gap separating two annular beads 52, the gap being if necessary provided with a rigid annular wedge 56 for the better distribution of the crimping pressure exerted on the end of the sleeve 51. The edge of the bush 55a opposite from the cap 55 is turned down beneath the last bead 52 engaging in the bush.

The result is an improvement in the strength and durability of the assembly of the cap 55 on the sleeve 51 and of the behaviour of the sleeve wall in the zone adjacent the cap.

I claim:

1. A pump comprising a hollow housing having rigid walls to be immersed in a liquid to be sucked therein, said walls of said housing bearing an intake valve and a delivery valve connected to a delivery tube, said housing containing a resiliently deformable chamber connected through a said wall of said housing to an end of a control tube full of liquid in the operative position and having its other end connected to a control cylinder in which an actuating piston is slidably movable, between a position of maximum volume of a part of the cylinder connected to the resilient chamber and a position of minimum volume of said part of the cylinder, wherein the delivery tube and the control tube are connected to each other in the vicinity of the housing by a priming conduit including a check valve for allowing the liquid to flow only from the delivery tube downstream of said delivery valve to the control tube, whereby the head of liquid in the delivery tube passes to the control tube to replace air in the deformable chamber and the control tube and the control cylinder.

2. A pump according to claim 1, in which the housing essentially comprises an elongate hollow cylindrical member adapted to fit into a drill hole terminating in a sheet of water, wherein the resiliently deformable chamber comprises a resilient sleeve of rubberlike material coaxial with the cylindrical member, and comprising transverse reinforcement means comprising at least one layer of helically wound wire coaxial with the resilient sleeve, said sleeve comprising two end caps, one of which is detachably fixed to the upper end wall of the cylindrical member in the service position, by means of an axial tubular connection communicating with the control tube through said upper end wall.

3. A pump according to claim 2, wherein said upper end wall of the cylindrical member comprises a casing containing the delivery valve, the priming conduit connecting the delivery tube to the control tube, and the check valve of said priming conduit.

4. A pump according to claim 1, wherein the control cylinder is arranged vertically in the service position and mounted on a bed plate having attachment means to be fixed at the head of the drill hole, so as to accommodate the control cylinder, at least partly, in the top of said hole beneath said plate.

5. A pump according to claim 1, the resiliently deformable chamber comprising a resilient sleeve of rubber-like material coaxial with the cylindrical housing and mounted therein with radial clearance, said sleeve comprising transverse reinforcement means comprising at least one layer of helically wound wire coaxial with the resilient sleeve, said sleeve being thick enough to withstand the hydrostatic pressure of the control tube and the delivery tube in a resilient stage of partial extension of the sleeve in the axial direction, the arrangement of the sleeve in the housing permitting a further axial extension of the sleeve under an additional pressure provided by the actuating piston moving toward said position of minimum volume, and the resilient strength of the sleeve allowing the sleeve to return to said partial extension when the actuating piston is released, said piston being thereby brought back towards said position of maximum volume by the resilient strength of the sleeve.

6. A pump comprising a hollow housing having rigid walls to be immersed in a liquid to be sucked therein, said walls of said housing bearing an intake valve and a delivery valve connected to a delivery tube, said housing containing a resilienty deformable chamber connected through a said wall of said housing to an end of a control tube full of liquid in the operative position and having its other end connected to a control cylinder in which an actuating piston is slidably movable, between a position of maximum volume of a part of the cylinder connected to the resilient chamber and a position of minimum volume of said part of the cylinder, wherein the delivery tube and the control tube are connected to each other in the vicinity of the housing by a priming conduit including a check valve for allowing the liquid to flow only from the delivery tube to the control tube, there being a bleeding aperture on a side wall and near an upper end of said cylinder in the service position, the actuating piston having a bleeding channel arranged to communicate on one side with the control tube, and on the other side with the bleeding aperture of the cylinder wall near said position of the piston corresponding to the maximum volume of the cylinder, in order to let air escape from the resilient chamber and from the control tube.

* * * * *